United States Patent [19]

Plichta et al.

[11] Patent Number: 5,478,666
[45] Date of Patent: Dec. 26, 1995

[54] MOLTEN SALT ELECTROCHEMICAL CELL INCLUDING AN ALKALI METAL INTERCALATED PETROLEUM COKE AS THE ANODE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 340,982

[22] Filed: Nov. 17, 1994

[51] Int. Cl.$^6$ .................................... H01M 6/20
[52] U.S. Cl. ................... 429/103; 429/218; 429/221; 429/223; 429/224; 429/247
[58] Field of Search ................... 429/103, 218, 429/223, 221, 224, 247, 191, 199

[56] References Cited

U.S. PATENT DOCUMENTS

| | | | |
|---|---|---|---|
| 4,304,825 | 12/1981 | Basu | 429/103 |
| 4,423,125 | 12/1985 | Basu | 429/194 |
| 4,463,071 | 7/1984 | Gifford et al. | 429/194 |
| 4,517,265 | 5/1985 | Belanger et al. | 429/217 |
| 4,707,423 | 11/1987 | Kalnin et al. | 429/112 |

Primary Examiner—Prince Willis, Jr.
Assistant Examiner—M. Nuzzolillo
Attorney, Agent, or Firm—Michael Zelenka; Roy E. Gordon

[57] ABSTRACT

High temperature molten salt electrochemical cells that are economic are made using an alkali metal intercalated petroleum coke as the anode.

8 Claims, No Drawings

MOLTEN SALT ELECTROCHEMICAL CELL INCLUDING AN ALKALI METAL INTERCALATED PETROLEUM COKE AS THE ANODE

GOVERNMENT INTEREST

The invention described herein may be manufactured, used, and licensed by or for the Government for governmental purposes without the payment to us of any royalties thereon.

FIELD OF INVENTION

The invention relates in general to high temperature molten salt electrochemical cells and in particular to such cells using an alkali metal intercalated petroleum coke as the anode.

BACKGROUND OF THE INVENTION

High temperature rechargeable molten salt batteries typically use lithium alloy negative electrodes such as LiAl. This alloy, however, degrades with cycling due to agglomeration of the aluminum in the alloy at the high operating temperatures of the molten salt cells (>300° C.). In addition, the use of LiAl as the negative is costly in that special handling is required in order to avoid reactivity with moisture and oxygen.

SUMMARY OF THE INVENTION

The general object of this invention is to provide a high temperature molten salt cell that will be economic and in which the aforementioned difficulties are overcome.

It has now been found that the aforementioned object can be attained by using an alkali metal petroleum coke as the anode of the molten salt cell.

That is, high temperatures molten salt cells can be made that use an alkali metal petroleum coke as for example, a lithiated petroleum coke as the anode that provides significant cell cycling at cell voltages similar to those obtained using more costly lithium metal alloy anodes. "Petroleum coke" as the term is used herein refers to a petroleum based carbon black.

DESCRIPTION OF THE PREFERRED EMBODIMENT

Petroleum coke is lithiated electrochemically in situ in a molten salt cell consisting of a LiAl (20 wt % Li) electrode, an electrolyte of LiCl-LiBr-LiF, a MgO separator, and petroleum coke as the other electrode. The cell is operated at 475° C. under a flowing argon atmosphere in which the petroleum coke is reversibly intercalated with lithium between 0 volts and 1.85 volts versus a LiAl electrode. The cell is prepared in an argon filled dry box having a moisture content of less than 0.5 ppm. The cell is prepared as follows; powdered LiAl is pressed in a 13 mm diameter steel die to 4,000 pounds pressure. A powdered electrolyte/separator mixture consisting of 65 wt % LiCl-LiBr-LiF and 35 wt % MgO is pressed on top of the LiAl pellet, in the same die, to a total pressure of 10,000 pounds. Powdered petroleum coke (Conoco XP-200) is pressed separately from the other pellets in a similar manner to 4,000 pounds and stacked on top of the electrolyte layer. The cell stack is assembled into a spring loaded cell jig, that is affixed with molybdenum current collectors. The spring loaded cell assembly is sealed in a Pyrex glass vessel, affixed with electrical feed throughs and thermocouples for providing current to the cell and for temperature monitoring, respectively. The cell is electrochemically operated at a constant current density of 1 mA/cm² at 475° C., under a flowing argon atmosphere.

In a typical constant current cycle of the cell, the average cell potential for the cycle is 0.25 volt during lithium intercalation of the petroleum coke and 0.76 volt during deintercalation versus LiAl. The cycling efficiency is 100% between the cell voltage limits of 0 and 1.85 volts. Because of the high operating temperature and difficulties in using molten lithium metal, the degree of lithiation of the petroleum coke in the cell is limited to the potential of the LiAl counter electrode (0.3 volt versus lithium). In practice, the petroleum coke would be fully lithiated either electrochemically or chemically in order to optimize the capacity of the electrode. The theoretical lithium capacity for petroleum coke is one mole of lithium per six moles of carbon where the reaction can be represented as follows, $$\text{Intercalation: } x\text{ Li}^+ + 6\text{C} + 6e^- \rightarrow \text{Li}_x\text{C}_6, \text{ where } (0<x<1) \quad \text{(I)}$$

and deintercalation as the reverse reaction of (I).

The advantages to using lithiated petroleum coke over LiAl alloy as the negative in molten salt cells, is that the agglomeration effects observed with cycling LiAl alloys are eliminated. In addition petroleum coke is a lower cost material requiring less special handling as is the case with LiAl alloys. Finally, the use of petroleum coke as the negative electrode enables cells to be prepared in which the negative electrode can be lithiated in situ by preparing the cell in the discharged state. This type of cell assembly eliminates the handling of reactive lithium components altogether and significantly increases the safety in fabricating cells as well as reducing costs. An example of a molten salt cell reaction in which the petroleum coke is then lithiated from the discharged state is as follows, (Negative Electrode)

$$4x\text{ Li}^+ + 24\text{C} + 4xe^- \rightarrow 4\text{Li}_x\text{C}_6, \text{ where } (0<x<1) \quad \text{(II)}$$
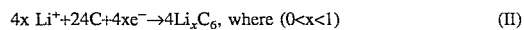

(Positive Electrode)

$$2x\text{ Li}_2\text{S} + x\text{ Fe} \rightarrow x\text{ FeS}_2 + 4x\text{ Li}^+ + 4xe^- \quad \text{(III)}$$
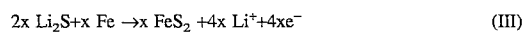

(Overall)

$$2x\text{ Li}_2\text{S} + x\text{ Fe} + 24\text{C} \rightarrow x\text{ FeS}_2 + 4\text{Li}_x\text{C}_6 \quad \text{(IV)}$$
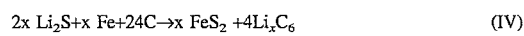

where reaction IV shows the overall cell reaction during charging. Other possible cathode materials that can be substituted for FeS₂ and prepared from their respective discharged states are NiS₂, COS₂, FeS, TiS₂, as well as other sulfides of the transition metals. In addition, transition metal oxides can be used as the cathode according to the above reactions in which Li₂S is substituted by Li₂O. Possible oxide cathode material that may be used include LiCoO₂, LiNiO₂, LiFeO₂, LiCrO₂, LiMnO₂, V₂O₅, MnO₂, LiMn₂O₄ as well as other oxides of the transition metals. Other cathode materials that may be used include transition metal halides such as CuCl₂, NiF₂, and FeCl₃ as well as the halides themselves from group VIIa of the periodic table. Other molten salt electrolytes that can be substituted in the cell include the alkali metal halides and their mixtures including those electrolytes in which the petroleum coke is capable of being intercalated by an alkali metal either electrochemically or chemically.

We wish it to be understood that we do not desire to be limited to the exact details of construction shown and described for obvious modifications will occur to a person skilled in the art.

What is claimed is:

1. A molten salt electrochemical cell including an alkali metal intercalated petroleum coke as an anode.

2. A molten salt electrochemical cell according to claim 1 that is rechargeable.

3. A molten salt electrochemical cell according to claim 1 wherein the alkali metal intercalated petroleum coke is a lithium intercalated petroleum coke.

4. A molten salt electrochemical cell according to claim 3 wherein the petroleum coke is lithiated electrochemically in situ in a molten salt cell including a LiAl(20 wt % Li) electrode, an eutectic electrolyte of LiCl-LiBr-LiF, a MgO separator, and petroleum coke as the other electrode, the cell being operated at 475° C. in an inert argon atmosphere in which the petroleum coke is reversibly intercalated with lithium between $_0$ volts and 1.85 volts versus a LiAl electrode.

5. A molten salt electrochemical cell according to claim 1 wherein the alkali metal petroleum coke is intercalated chemically.

6. A molten salt electrochemical cell according to claim 3 wherein the lithiated petroleum coke is intercalated chemically.

7. A molten salt electrochemical cell consisting of an intercalated alkali metal petroleum coke as the anode, at least one alkali metal halide as the electrolyte, and at least one compound selected from the group consisting of $NiS_2$, $FeS_2$, $CoS_2$, $LiCoO_2$, $LiNiO_2$, $LiFeO_2$, $LiCrO_2$, $CuCl_2$, $NiCl_2$, $COS_2$, $NiS$, $CoS$, $FeS$, $MnO_2$, $LiMn_2O_4$, $TiS_2$, $CuCl_2$, $NiF_2$ and $FeCl_3$ as the cathode.

8. A molten salt electrochemical cell consisting of lithium intercalated petroleum coke as the anode, $FeS_2$ as the cathode, and a mixture of LiCl, LiBr, and LiF having the composition 9.6 weight percent LiF, 22.0 weight percent LiCl and 68.4 weight percent LiBr as the electrolyte.

* * * * *